March 1, 1955 W. J. GROSS 2,703,083
ADHESIVE BANDAGE
Filed Jan. 4, 1955 3 Sheets-Sheet 1

INVENTORS
WILLIAM J. GROSS
BY
Benton A. Bull
ATTORNEY

March 1, 1955 W. J. GROSS 2,703,083
ADHESIVE BANDAGE
Filed Jan. 4, 1955 3 Sheets-Sheet 2

INVENTOR
WILLIAM J. GROSS
BY
Benton A. Bull
ATTORNEY

March 1, 1955 W. J. GROSS 2,703,083
ADHESIVE BANDAGE
Filed Jan. 4, 1955 3 Sheets-Sheet 3

INVENTOR
WILLIAM J. GROSS.
BY
Benton A. Bull
ATTORNEY

United States Patent Office 2,703,083
Patented Mar. 1, 1955

2,703,083

ADHESIVE BANDAGE

William J. Gross, Franklin Township, Somerset County, N. J.

Application January 4, 1955, Serial No. 479,692

18 Claims. (Cl. 128—156)

The present invention relates to surgical dressings and more particularly to adhesive bandages of the type widely used, for example, in the first-aid treatment of superficial lesions of the skin.

This application is a continuation-in-part of the now abandoned applications Ser. No. 363,991 filed June 25, 1953, and Ser. No. 382,414 filed September 25, 1953.

An adhesive bandage is defined in the United States Pharmacopoeia as "a sterile individual dressing prepared by affixing a plain absorbent compress to a strip of film or fabric coated with a pressure-sensitive adhesive composition" (U. S. P. XIV, pp. 64 and 65). The absorbent compress or pad and exposed adhesive surfaces are "protected by overlapping strips of crinoline or other protective material of a width not less than that of the dressing" (Idem). These overlapping strips (hereinafter called "facings" or "facing members") are, of course, intended to be removed just before the bandage is applied to the skin. The U. S. Pharmacopoeia requires "each bandage" to be "packaged individually in such manner that sterility is maintained until the individual package is opened" (Idem).

For over a quarter of a century prior to the present invention, crinoline (i. e., a heavily starched and dried gauze) had been almost universally employed as the facing material for adhesive bandages. With crinoline facings, the cross-hatched imprint of the threads (which were usually imbedded to some extent in the adhesive mass) appeared on the adhesive after the crinoline was removed. Although it was commonly thought that the rough surface of the adhesive afforded a greater opportunity for adhesion to the skin, it was widely recognized that the full sticking powers of the adhesive mass were not developed unless the user applied moderate pressure for a perceptible period of time after the bandage was placed on the skin.

For many years prior to the present invention, manufacturers of adhesive bandages had been troubled with consumer complaints that their products would not stick properly when applied to the user's skin. Although the problem had long been recognized in the industry, no satisfactory solution was available prior to the present invention. Heretofore, the manufacturer who sought to minimize such complaints had only one means of coping with the problem: namely, to reformulate the composition of his adhesive mass in order to increase its total adhesive power, tackiness, softness, or flow characteristics. However, as all manufacturers of adhesive bandages are acutely aware, mass formulations for such bandages basically represent precarious compromises between interrelated, often conflicting, and sometimes mutually exclusive requirements. Accordingly, changes in mass formulation intended to solve the problem of skin adhesion often caused far greater complications than the problem sought to be overcome by such changes. Thus, for example, a mass of significantly higher adhesive powers might hold the imbedded crinoline so tenaciously that the facing members could not be removed without pulling the adhesive mass off the backing. In addition, a soft, highly tacky adhesive mass might adhere so tenaciously to the skin that removal of the bandage was painful and accompanied by a high transfer of the mass from the backing to the skin, leaving behind an objectionably sticky deposit on the skin of the user. Furthermore, the use of a mass having an inherently greater total adhesive power complicated the manufacturer's processing difficulties; for in some cases the adhesive components of the bandage would adhere with such force and tenacity to certain parts of the adhesive bandage machine that its rate of production was significantly reduced. Another significant factor was that a soft adhesive mass of greater flow characteristics greatly aggravates the manufacturer's problem with "exudation" or lateral flow of the mass beyond those areas intended to be covered with adhesive. Such exudation problems become especially acute at the elevated temperatures necessary to produce the sterile product required by the U. S. Pharmacopoeia. As a consequence, use of a mass of greater flow characteristics often resulted in a completely useless product, in excessively high rejections for failure to meet the manufacturer's quality standards, and in high consumer complaints if substandard bandages were not detected and discarded by the manufacturer.

As a result of the foregoing and other complications, changes in mass formulations were feasible only to a limited degree, and within such limits they have heretofore been ineffective in solving a basic problem of a product which, in the final analysis, owes its utility to the degree that it sticks satisfactorily to the skin of the ultimate consumer.

Generally speaking, the object of the present invention is to provide an effective solution to this long-felt need in the industry.

A more particular object is to provide a method and means by which the adhesive bandage manufacturer may achieve the maximum in the ability of his product quickly and reliably to stick to the user's skin.

A related object is to devise an adhesive bandage having the foregoing unique advantages and, at the same time, to afford the adhesive bandage manufacturer far greater latitude than he has heretofore had in choosing mass formulations designed to meet his quality standards in other respects as well.

There are certain additional characteristics of an adhesive bandage which should be fulfilled. Thus, many facing materials tend to adhere to adhesive surfaces with great tenacity and can be removed only by application of an excessive force. Such excessive force may pull the adhesive mass wholly or partly off the backing or so distort its surface as to interfere with its adhesive characteristics. Hence, a still further object of the invention is to provide a facing which, with respect to the adhesive mass, has an acceptable degree of releasability so that removal of the facing does not pull the mass off the backing or distort the surface characteristics of the mass.

Another prerequisite of an adhesive bandage in this country is that it must be "sterile" as sold and "packaged individually in such a manner that sterility is maintained until the individual package is opened" (U. S. P. XIV, p. 65). To meet this requirement the manufacturer of adhesive bandages must first place each bandage in the prescribed package and thereafter sterilize the entire packaged bandage. The effect of sterilizing conditions upon the components of an adhesive bandage are therefore of controlling importance from the point of view of the manufacturer. Practical sterilizing conditions require temperatures of at least 120° F. or more in order for the time required for sterilization to be of reasonably short duration. Generally, chemical sterilization may be carried out at temperatures of 140° to 180° F. Steam sterilization, which is still more rigorous, may be carried out at 235° to 250° F. A bandage which will withstand steam sterilization will obviously withstand the milder thermal conditions of chemical sterilization. Under sterilizing conditions, many latent properties of material, which under normal conditions would never appear, often become apparent. For example, facing material may radically change its dimensions by relaxation of internal strains. Any migratory ingredients in the adhesive mass, backing film or facing material may tend to transfer from one layer to the other, or the properties of the various components of the bandage may be altered. Accordingly, still another object of the invention is to provide an adhesive bandage the components of which will undergo sterilizing conditions without impairing or destroying the acceptability or marketability of the product.

Other objects and advantages of the invention will become apparent as the description progresses in connection with the several figures of the drawing wherein.

In accordance with the present invention, the foregoing objects and advantages may be attained by a basic change in the adhesive bandage structure and in its mode of assembly. In the improved adhesive bandage of the invention, crinoline, as such, is not employed as a facing member. Instead, the present invention utilizes a facing member having a surface comprising a film of organic material in contact with the adhesive coating. This, in and of itself, does not provide the solution to the problem. In order to overcome the long standing defect of prior adhesive bandages, the film of organic material and its relationship to the underlying adhesive coating must meet several criteria, of which those defined in the four immediately following paragraphs represent basic requirements.

Firstly, the film should present a surface that is smooth and continuous. Ordinarily, this means that the film will be imperforate and also that it will exhibit a lustrous, glossy, or shiny appearance when viewed slantwise against a source of light. There are, of course, varying degrees of light reflectance, and a satisfactorily smooth film may have its surface treated in various ways known in the art so that its light reflectance is greatly reduced but its surface smoothness is not materially altered. As a rule of thumb, however, light reflectance provides a convenient test for selecting suitably smooth surfaces.

Secondly, the film should comprise an organic material that is substantially inert with respect to the mass used in forming the adhesive areas of the bandage. This means, for example, that the film should not contain substances that would react chemically with the adhesive mass, nor migratory ingredients, such as migratory plasticizers, that would migrate into the adhesive mass to a degree significantly to impair its adhesive properties.

Thirdly, the film must be brought into and maintained in intimate contact with its underlying adhesive coating over substantially the entire surface thereof, the intimacy of contact being sufficient substantially to exclude air pockets and impart to the underlying adhesive coating, at its interface with the facing member, the smooth surface characteristics of the film. Ordinarily, this means that during manufacture the underlying adhesive coating by suitable means is brought into such intimate relationship with the overlying film that the latter acquires and maintains to a substantial degree a correspondingly smooth, continuous surface, with no occluded air pockets separating the surface of the film from the surface of the mass. This may be attained, for example, by suitably increasing the pressure normally applied to the facing member as it is positioned on the bandage; or it may be attained, or still further enhanced, by the time and temperature conditions used during chemical or steam sterilization of the finished product.

Fourthly, the film should be releasable by the particular adhesive mass selected so that when the facing member is removed, the adhesive coating will not be separated from its backing and the smooth surface characteristics of the adhesive existing at the interface prior to its removal will remain substantially unimpaired. This may be attained, for example, by treating the organic film with certain "release agents" to reduce its adhesion by the mass; or by modifying the mass formulation to decrease its adhesion to the film; or both.

When the facing members of my bandage are removed, the interfacial surfaces of the mass will present substantially the same smooth continuous condition they possessed immediately before the facing members were removed. Thus, if the facing members selected are lustrous, glossy, or shiny, the exposed mass surfaces, when viewed slantwise against a source of light, will exhibit a lustrous, glossy, or shiny appearance, substantially to the extent that the separated films possess such surface characteristics. Such exposed mass surfaces, when brought into contact with an object having a smooth clean surface, will adhere with astonishing tenacity even if the contact merely involves lightly brushing the mass surfaces against said object. The invention therefore affords a highly effective means for making immediately available the maximum adhesive property of the mass used in the adhesive bandage.

The property of instantaneous adhesion conveniently may be demonstrated by employing a small metal box with hinged cover and smooth exterior surfaces, such as the boxes commonly used by all U. S. manufacturers for holding adhesive bandages. Such a box is large enough to hold weights amounting to several hundred grams. A suitable box with its lid closed and weighing, for example, 55 gms. is touched at room temperature with one half of the adhesive surface freshly exposed from a ¾" x 3" adhesive bandage. Contact with the horizontal metal surface of the box is made in such a way that the adhesive rests on the surface under its own weight only, with no external pressure applied. After remaining in contact with the metal surface for about five seconds an attempt is made to raise the box from its support by lifting with the free end of the adhesive bandage at an angle 90° from the horizontal surface. In the case of the adhesive bandages of the present invention, there is instantaneous and firm adhesion between the metal and the adhesive mass. Not only may the empty box be easily lifted but the adhesion will be sufficiently strong to allow the box to be lifted when additional weights are placed inside it, the maximum weight generally being between 200 and 400 grams. This is in striking contrast to adhesive bandages which have been faced with crinoline or like materials in which case, because there is little if any instantaneous adhesion between the adhesive mass and the metal, the box cannot usually be lifted even when the box is free of added weights.

One of the important features of the present invention is that the adhesive characteristics of a given adhesive bandage may be improved to an astonishing degree without any changes whatsoever in the composition of an otherwise satisfactory adhesive mass. The invention, moreover, enables the manufacturer in some cases to utilize mass formulations that would otherwise be unacceptable because of inferior adhesive properties, or in other cases to make certain desirable changes either in mass composition or mode of application that would otherwise be precluded. Thus, for example, since the facing members of the present invention are not imbedded in the mass (as is the case with a material like crinoline), the thickness of the applied mass may be considerably reduced, particularly if the backing material of the adhesive bandage also presents a smooth surface. Such a reduction in mass thickness tends to minimize the problems of exudation and mass transfer to the skin of the user. Again, in some cases a reduction in the inherent tackiness, softness, flow characteristics, or total adhesive power of the mass may be made without sacrificing the instantaneous adhesive characteristics desired. With certain mass formulations, such changes may be desirable; for example, to minimize transfer of the mass to the skin of the user; to prevent or minimize lateral flow or exudation of the mass; to improve release properties by reducing the stripping forces required to remove the facing members; or for other reasons.

It is recognized that continuous facing materials of various types, including organic films and metallic foils, have heretofore been suggested in the art. (See, for example, Morgan, U. S. Patent No. 2,484,045; Herbel, French Patent No. 755,273; Heldmann, U. S. Patent No. 2,544,315; and Anderton and Stephenson, British Patent No. 705,161.) The present invention comprises an adhesive bandage incorporating a continuous facing that provides a solution to the problem of skin adhesion for the reason that it involves the new and basic relationships stated above that must obtain to produce the adhesive bandage of the present invention.

As indicated above, the manner in which the facing members of the present invention are disposed in relation to the underlying adhesive areas of an adhesive bandage is especially important. This being the case, those manufacturing operations that have been found especially helpful in insuring the necessary intimacy of this relationship will first be described. Following this, the overall structural features of several adhesive bandages and modifications thereof, all made in accordance with the invention, will be discussed. Thereafter, certain components of the bandage and their interrelations will be taken up. Finally, a number of examples of adhesive bandages having facing members composed of various specific organic films suitable for use in accordance with the present invention will be described in considerable detail.

The foregoing approach is merely an expository convenience adopted to facilitate disclosure of the present invention and especially the manner in which it may be carried into practice. It should clearly be understood, however, that the invention is not to be limited to, or circumscribed by, the specific details hereinafter set forth, since many variations, modifications and extensions thereof will readily be apparent to those skilled in the art after the basic principles of the invention have been mastered.

METHODS OF MANUFACTURE

Figure 1:
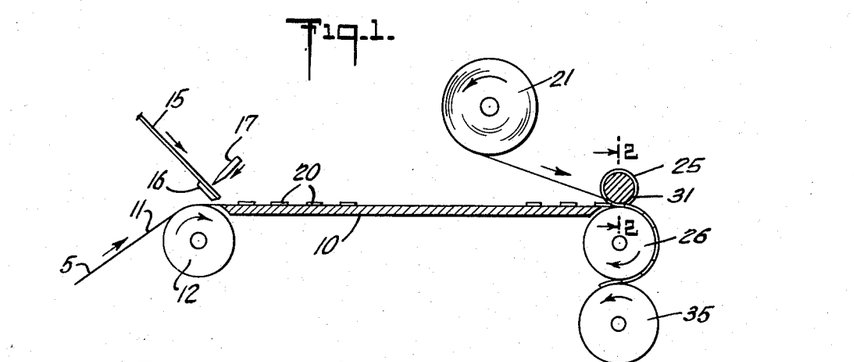
Fig. 1 is a diagrammatic view in elevation of an adhesive bandage manufacturing operation.
Figure 2:
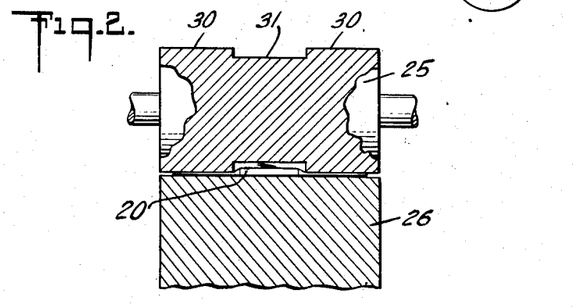
Fig. 2 is a section taken along plane 2—2 of Fig. 1.

Referring now to Figs. 1 and 2 of the drawing, 10 designates a stationary platform over which a continuous sheet of flexible backing material 11 having an adhesive mass 5 on its top surface is passed after passing over rotating roll 12. Gauze 15 is withdrawn from a source of supply (not shown) and passed between anvil 16 and reciprocating knife 17 where individual gauze pads are cut from the continuous strip 15 and placed on backing 11 as shown at 20. Continuous facing material in accordance with the invention is withdrawn from supply roll 21 and fed toward the top surface of the pads and exposed portions of the adhesive 5 at a suitable angle. The composite web enters the nip between spring-pressured pressing roll 25 and pull roll 26, which have smooth peripheral surfaces. The function of pressing roll 25 is to press facing sheet 21 into uniformly intimate contact with the adhesive surface 5, that is, intimate contact over the whole interface between adhesive and facing sheet so as to exclude occluded air pockets and impart to the adhesive, at the interface with the facing sheet, the smooth surface characteristics of the latter. To this end the rolls are constructed as shown in section in Fig. 2. Roll 25 has one cylindrical portion 30 of greater radial dimension and an annular recess 31 having a smaller radial dimension. Recess 31 is of axial and radial dimension sufficient to accommodate the length and thickness, respectively, of an individual dressing pad 20 so that the raised cylindrical portions 30 bear only against portions of the composite web which are apart from and on opposite sides of the dressing pad 20.

As above indicated, the operation of roll 25 is so controlled as to remove substantially all occluded air from the interface between facing 21 and the adhesive mass 5 on backing 11. By forcing sheet 21 into uniformly intimate contact with the adhesive surface 5 with positive exclusion of air which tends to be occluded therebetween, the surface of the mass acquires the smooth characteristics of the bottom surface of facing sheet 21. When the facing sheet is thereafter removed from the finished adhesive bandage, the smooth surface remains on the adhesive, thereby providing the desirable instantaneous adhesion characteristics described above.

Prevention of air occlusion (which would unavoidably result from casually placing facing material 21 on the adhesive surface) is also necessary from the standpoint of avoiding occurrence of undesirable effects during the required sterilization of the product. That is, any occluded air during sterilization would tend to expand, thereby separating the facing sheet from the adhesive, distorting the facing and backing, "cratering" the adhesive mass, and making an otherwise unacceptable product. The intimate contact between facing and adhesive with removal of occluded air is also important in providing a structure having desired strength and dimensional stability so as to resist distortion during sterilization. The product thereby obtained has greater dimensional stability and freedom from strain as compared with products in which the facing material is not so intimately secured to the adhesive.

Figure 3:
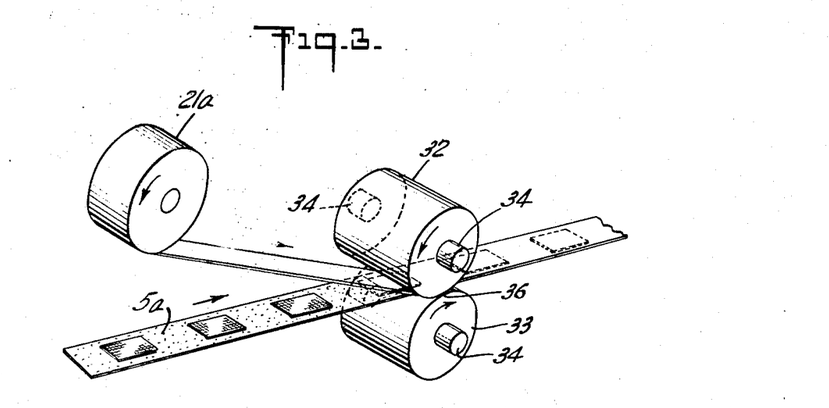
Fig. 3 is an isometric view of a modified adhesive bandage manufacturing operation.
Figure 4:
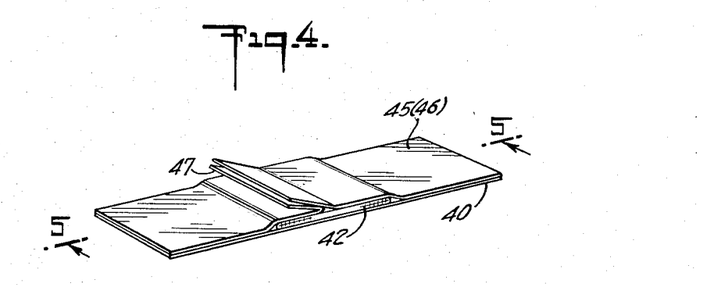
Fig. 4 is an isometric view of one form of adhesive bandage in accordance with the invention.

In certain types of adhesive bandage machines, the backing web is passed through the machine in a direction parallel to the long dimension of the adhesive bandage. This type of machine is illustrated in Figs. 3 and 4. In this case it will be unnecessary and, in fact, undesirable to provide a recess such as 31 (Fig. 2) on the periphery of pressing roll 25. On the other hand, on such a machine the counterparts of rolls 25 and 26, which are shown at 32 and 33 of Fig. 3 (with supporting means 34), will have surfaces which are substantially equidistant from each other at all points along the nip 36 in order that the continuous facing may be placed in intimate contact with the adhesive over the whole interface between adhesive and facing. In the latter embodiment, facing material is fed from supply 21a into nip 36 at an angle to the adhesive layer 5a just as in the Fig. 1 embodiment.

Although preferred procedure includes use of rotating smooth-surfaced pressure rolls such as 25 and 26, and 32 and 33, to press the facing material of the invention into intimate contact with the adhesive mass, within the broad scope of the invention one or both of rolls 25 and 26, and 32 and 33, may be stationary, although still pressed together, and the composite web pulled through the space therebetween by suitable means (not shown).

Figure 5:
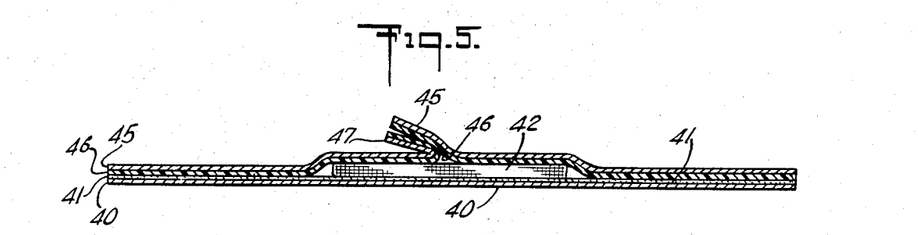
Fig. 5 is a sectional view taken along plane 5—5 of Fig. 4.

After leaving the nip between rolls 26 and 35 the composite web comprising backing sheet, dressing pads and facing, is severed transversely to form individual adhesive bandages of the general type illustrated in Figs. 4 and 5, by machinery (not shown). In order to provide uniformity in dimension of individual bandages in the direction of movement of the composite web through the machine, in the case of an extensible backing such as polyvinyl chloride film, a carrier sheet such as paper (not shown in the drawing) may be provided, which carrier sheet will be disposed below backing strip 11 as the strip passes through the machine, and will be removed after the composite web leaves the nip between rolls 26 and 35 and before the web enters the cutting mechanism.

Referring now to Figs. 4 and 5, reference number 40 designates a sheet of adhesive tape backing material which may be either woven or non-woven fibrous material or non-fibrous material such as extensible vinyl plastic. Deposited on sheet 40 at 41 is a layer of pressure-sensitive adhesive mass which affords the desired degree of adhesion to the object to which the dressing is to be secured. Dressing pad 42, composed preferably of suitably folded woven or non-woven fabric, paper or other absorbent material, is placed on and secured to adhesive layer 41. Reference characters 45 and 46 represent, respectively, paper or other fibrous supporting sheets, laminated to a smooth continuous organic facing material by any suitable laminating adhesive (not shown). Sheets 45 with facings 46 comprise facing members which are disposed adjacent, and removably secured, to adhesive mass 41. One of the facing members is bent back on itself to form removal tab 47 which is overlaid by the other facing member in the region above dressing pad 42. When the facing members are removed from the adhesive bandage, a smooth surfaced adhesive mass remains, corresponding to the smoothness of the surface of the organic facing material. The adhesive surface therefore possesses excellent instantaneous adhesion characteristics.

Figure 6:
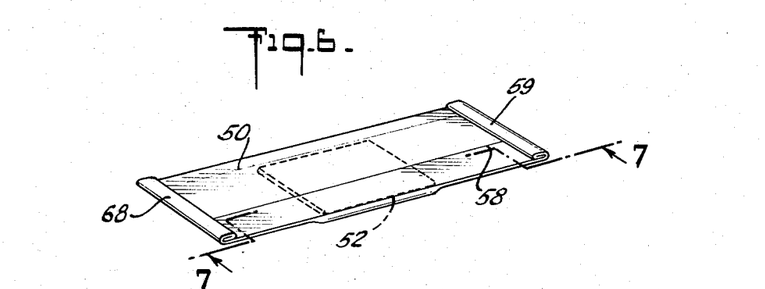
Fig. 6 is an isometric view of an adhesive bandage having a modified type of facing material within the scope of the invention.
Figure 7:
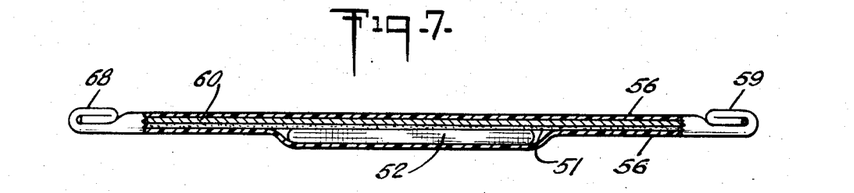
Fig. 7 is a sectional view taken along plane 7—7 of Fig. 6.

Referring now to Figs. 6 and 7, which illustrate a somewhat modified form of the invention, still, however, embodying outstanding features thereof, 60 represents a sheet of backing material similar to backing 40 of Figs. 4 and 5, and 51 represents a pressure-sensitive adhesive mass coated thereon. 52 designates a dressing pad similar to dressing pad 42 of Figs. 4 and 5. The organic film facing material is indicated at 56 and may be a free unsupported film (unlaminated) as shown. In this embodiment of the invention, facing material may be in a single piece as shown, covering both the exposed adhesive surfaces and dressing pad of the bandage and having in addition margins which are sufficiently extensive to project beyond all four edges of the bandage and folded on the back side thereof in a longitudinal seam 58 and end seams 59 and 68. Thus, the combined function of the facing sheet and an adhesive bandage wrapper is served by a single sheet of film.

Figure 8:
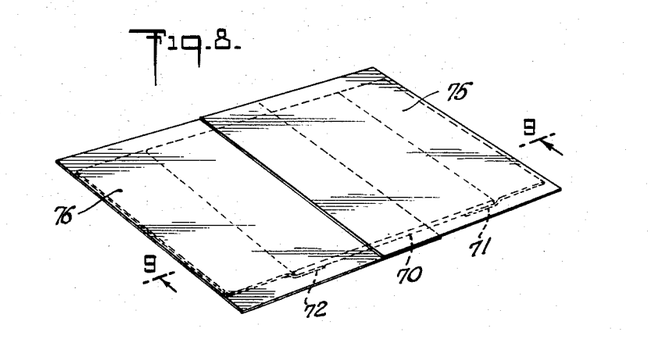
Fig. 8 is an isometric view of still another form of adhesive bandage within the scope of the invention.
Figure 9:
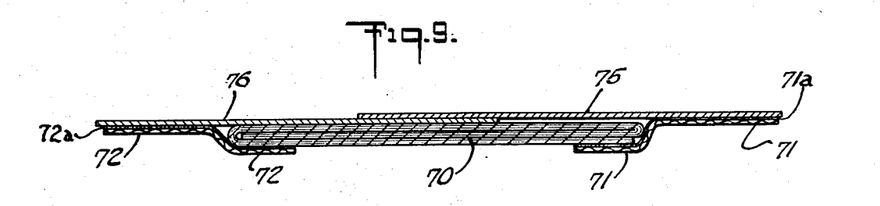
Fig. 9 is a sectional view taken along the plane 9—9 of Fig. 8.
Figure 10:
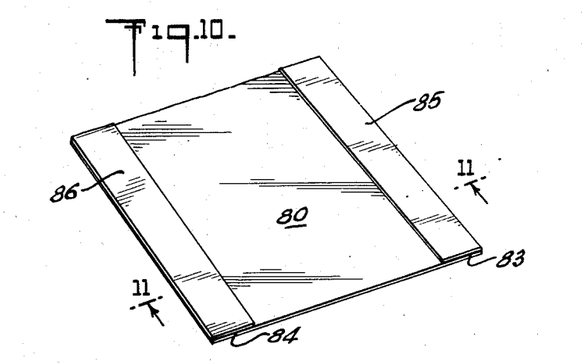
Fig. 10 is an isometric view of a still further form of adhesive bandage in accordance with the invention.
Figure 11:
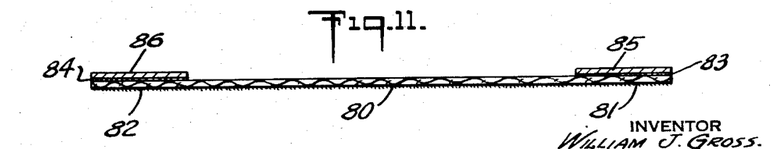
Fig. 11 is a sectional view taken along the plane 11—11 of Fig. 10.

Somewhat modified forms of adhesive bandages especially suitable for large size bandages are shown in Figs. 8 to 11. In Figs. 8 and 9, the adhesive bandage comprises a relatively large size pad 70 such as a typical 2″ x 2″ or 3″ x 3″ surgical sponge formed of folded surgical gauze. Two strips of surgical adhesive tape (generally indicated by reference numbers 71 and 72) are attached to two opposed marginal edges of the pad 70 in the manner shown, so as to provide exposed adhesive areas 71a and 72a upon removal of the overlying and overlapping facing members 75 and 76 in accordance with the invention. In Figs. 10 and 11, the modified adhesive bandage therein shown comprises a rectangular piece of woven fabric 80 such as a 2″ x 2″ square of flannel. The two opposed marginal edges 81 and 82 of this pad 80 are coated with a normally tacky pressure-sensitive adhesive mass 83 and 84. Overlying each of these pressure-sensitive coatings are facing members 85 and 86, applied in accordance with the present invention.

*Bandage components.*—(A) *The facing members*

Suitable facing materials are those which have at least one surface which is smooth and continuous, and constituted of organic material which is substantially inert with respect to the adhesive properties of the mass. In addition to being smooth, the facing surface is preferably glossy since it has been found that such glossy surface, when transferred to the adhesive mass, imparts to the latter superior properies in respect to instantaneous adhesion. Plasticizer exudation, if present, should be at a minimum and not of the type that adversely affects mass adhesiveness. The facing should have sufficient strength, particularly tear strength, to permit removal from the adhesive without breaking or tearing. Desirably, but not necessarily, the facing should have a certain degree of rigidity so as to improve the stiffness of the overall assembly. The facing is also preferably permeable to facilitate sterilization of the bandage. Finally, in the case of bandages that are to be steam sterilized, the smooth organic surface of the facing should be formed preferably by casting rather than by extrusion or calendering, since the latter two types of operation nearly always produce molecular orientation and internal strains in the film. Heating of such films to steam sterilizing temperatures relaxes these internal strains and produces undesirable changes of shape and consequent wrinkling or curling of the assembly.

Films made of vinyl chloride resins afford suitable facing sheets for purposes of the invention. Such types of vinyl chloride resins vary widely and may consist, for example, of copolymers, such as those of vinyl chloride with vinyl acetate, vinylidene chloride, and the like. These films may be utilized as laminates; as free, unsupported films; or as coatings. This latter type should possess sufficient adhesion to the particular backing selected and may be applied there as organosols, solutions, or as latices by methods well-known in the art. "Coatings" and "coated" as the terms are used herein include impregnation, i. e., permeation of the coating into the interstices of the base, when a substantial amount of the impregnant remains on the surface to provide the smooth and continuous surface of organic material.

Such vinyl chloride compositions as described above may or may not contain plasticizers. If plasticizers are used, they should be chosen so as not adversely to affect the properties of the underlying adhesive mass.

Cellulose acetate is another particularly good facing material. It may be used as an unsupported film of about 1.5 to 5 mils thickness; as a coating on paper; or as a laminate to a suitable backing. As a laminate it may be used in a thickness of about 1 mil, due to the reinforcing action of the backing. In general, laminates are preferable when the product is to be steam sterilized, as properly prepared laminates have superior resistance to the conditions of steam sterilization. Such laminates may be prepared with suitable well-known adhesives of any type, such as solution, emulsion, or hot melt adhesives.

One advantage of a properly chosen cellulose acetate is its releasability by the pressure-sensitive adhesive mass; in other words, the low order of force required to remove a cellulose acetate facing from a pressure-sensitive mass makes a cellulose acetate film especially desirable as a facing material.

Cellulose acetates when properly plasticized are in all practical respects chemically inert toward pressure-sensitive adhesive mass. In addition, typical commercial cellulose acetate films are extremely smooth and impart this smoothness to the adhesive mass which they face. The elevated temperatures which prevail during most sterilization procedures cause the adhesive mass to flow into very intimate contact with the film.

As an example of a commercially available cellulose acetate film suitable for purposes of this invention, mention may be made of the 1- and 2-mil films sold by the Eastman Kodak Company under the trade-mark "Kodapak IV." In this triacetate all of the three available points of substitution are substantially completely acetylated. It also possesses excellent heat and dimensional stability and is therefore especially suitable for bandages that are subjected to steam sterilization. However, the invention is not limited to facing films of cellulose triacetate since less completely acetylated material (e. g., 2.5 and below) may be utilized where the films have sufficient strength. Further, the plasticizer content of the film is preferably as low as it can feasibly be and still afford a film which has adequate flexibility. Plasticizers are selected which have the minimum deleterious effect upon adhesive mass and backing film. Suitable plasticizers are the phthalates of straight chain alcohols having five carbon atoms or less, such as dibutyl or diethyl phthalate, and aryl phosphates known to have plasticizing properties such as triphenyl phosphate. Where the adhesive bandages are to be steam sterilized the preferred plasticizer content preferably should not be greater than 15%. However, where the bandages are chemically sterilized, the plasticizer content may be higher.

Cellulose acetate films are preferably made by casting a solution thereof in a solvent such as ethylene chloride onto a smooth surface, and thereafter peeling the cellulose acetate film from the surface after evaporation of solvent. Cast films are relatively free from residual internal strains and have greater stability under steam sterilizing conditions than do extruded films. The latter have a tendency to shrink undesirably during steam sterilization. However, if the bandages are to be chemically sterilized, extruded or calendered films are acceptable.

Films formed of high molecular weight polyester of terephthalic acid and a dihydric alcohol such as ethylene glycol furnish another example of the type of film which is especially suitable as a facing material under the generic concept of the present invention. Such films are sold by the Du Pont Company under the trade-mark "Mylar."

Another type of facing material which may be used as an unsupported film or as a laminate to a backing material is cellophane (i. e., regenerated cellulose). Such cellophane preferably has a low plasticizer content. If plasticizers are present they should be chosen so as to have no deleterious effect on the pressure-sensitive adhesive mass. Among such cellophanes are those sold by the Du Pont Company under the trade-marks "Put" and "Puto" cellophane. The thickness of the cellophane should be such that it may be removed without tearing. Suitable coated cellophanes may be utilized if the coating is of a type to which the pressure-sensitive mass is substantially inert.

One of the advantages of a suitable cellophane laminate over the unsupported commercial cellophanes is its increased strength and decreased sensitivity to humidity changes. Typical of such laminates are a cellophane-to-paper laminate and a cellophane-to-polyethylene film laminate.

Additional examples of facing materials having smooth continuous facings suitable for the purpose of the present invention are urea-formaldehyde resin-coated papers, melamine-formaldehyde resin-coated papers, and polyethylene-coated papers. Generally speaking, resins of the first two require the presence of an additional resin, e. g., an alkyd type resin for its plasticizing action. Other polymeric materials such as the styrene resins, ethyl cellulose resins, polyvinyl alcohol resins are suitable, especially when used as paper coatings. The epoxy resins such as those produced by reacting polyphenolic compounds and epichlorohydrin are also valuable, for example, when coated on paper or similar backings.

Various release agents which improve the releasability of facing by the adhesive mass may be added to the smooth continuous surface of the facing. One of these release agents is a stearato chromic chloride, sold by the Du Pont Company under the trade-mark "Quilon." In the present application and claims, where the smooth film facing is indicated as being in contact with the adhesive mass, this expression is intended to include also assemblies in which the organic film is coated with a layer of such release agents.

The release properties of certain films (e. g. cellulose acetate and ethylene glycol terephthalate or "Mylar") are improved by steam and chemical sterilization. Although the explanation of this phenomenon is not clear, there is an appreciable improvement in the ease with which such films are releasable by the adhesive mass, after the bandages have been subjected to the thermal conditions of sterilization. Generally speaking, the property of instantaneous adhesion is also improved by the elevated temperatures prevailing during the sterilization step. This is true regardless of the type of organic film used as a facing. Apparently the elevated temperature prevailing during sterilization causes the mass to flow into very intimate contact with the film.

*Bandage components.—(B) The adhesive mass*

The properties of the adhesive mass are of importance in affording the proper relation between facing and adhesive surface which provides the advantages enumerated above. The mass is, of course, normally tacky and pressure-sensitive. It may have a base of natural or synthetic rubber such as those including styrene, butadiene, or isobutylene as a polymer or copolymer, or the mass may be based on other polymers such as polyalkylacrylate, etc. The tack, pressure-sensitivity, plasticity, and other properties are controlled by compounding the adhesive mass according to techniques well known in the art. When a solvent spread, as distinguished from a calendered mass, is used, solvent content is another variable to be controlled since residual solvent in the mass may generate gas bubbles and produce "cratering" during sterilization of the bandage.

Plasticity is a significant index and is maintained high enough to provide flow properties during manufacture of the product, particularly during compression of the facing and adhesive between rolls 25 and 26, so that a layer of adhesive will be produced which, when the facing is removed, will have a smooth surface. Plasticity is measured on a cylindrical pellet of adhesive mass 16 mm. in diameter and weighing 2.00 gms. by placing the pellet on a parallel plate plastometer, for example, of the type manufactured by the Scott Instrument Company, and maintaining the pellet and surroundings at 100° F. and under a 5000 gm. load, and noting the height of the pellet after 14 minutes. This height in millimeters is taken as a measurement of plasticity. The preferred plasticity range is approximately 1.70 to 2.20 mm.; however, lower or higher plasticities may be used, as will appear below.

One satisfactory adhesive mass is composed of polyisobutylene according to Wing U. S. P. 2,484,060, preferably with an average molecular weight (Staudinger) of about 100,000, compounded with effective amounts of tackifier, plasticizer and pigment, etc., as disclosed in the patent. For purposes of the present invention it is milled for time to impart plasticity of 1.5 to 2.5 mm.

Another suitable mass is based on natural pale crepe rubber (33%) and contains dehydrogenated rosin acid, M. P. 70–72° C. tackifier (25%), lanolin (7%) as plasticizer, $TiO_2$ (15%) and ZnO (15%) as pigment, and starch (5%) as filler, and is milled for time to provide a plasticity of from 1.5 to 2.5 mm. Blends of the synthetic and natural rubbers may be utilized, and it is preferred to control the ingredient proportions and other conditions to provide plasticities in the approximate range 1.7 to 2.2 mm.

Mass composition and plasticity have a controlling effect upon, and are in turn controlled by, the weight of mass and the pressure used in applying the facing thereto. As indicated above, the pressure by which the facing is affixed to the adhesive is controlled to provide substantial elimination of occluded air and impart to the mass the smooth surface characteristics of the facing member. The numerical degree of this pressure will depend to an extent upon the particular mass, the particular facing material, and the weight, i. e., thickness, of the mass. The weight of mass used is that which will afford adequate anchorage to the backing material and adequate adhesion to the skin (depending upon whether the backing is woven fabric or plastic sheet having a smooth surface), and exclusion of air between it and the facing with application of a reasonable degree of force from the pressure roll. Concurrently, the weight of the mass and the pressure with which the facing is applied to the mass are controlled to minimize occlusion of air, providing a positive bond between the facing and the adhesive without, however, causing blocking, i. e., permanent and irremovable contact between them. Starting with a mass having a composition suitable from the standpoint of pressure-sensitivity and other known requirements, and having in mind a desirable mass weight or thickness, sufficient pressure is supplied to exclude air from the facing-adhesive interface and impart to the mass the desired surface smoothness. In another situation the composition and plasticity may be fixed, and an adhesive bandage may be produced having desired properties by controlling the weight of mass and the pressure under which the facing is applied thereto.

*Bandage components.—(C) The backing material*

As backing for the mass, a nonporous film or a woven cloth may be used. For a nonporous backing, such as plasticized polyvinyl chloride film, the weight of mass applied to the backing may vary from about 1.0 to 3.5 ounces per square yard, preferably 2.0 to 2.6 ounces per square yard. If the adhesive bandages are backed with cloth, into which mass can flow or be pushed to some extent during the operation of mass application, a suitable range of mass weight is approximately 3.0 to 6.0 ounces per square yard.

Control of the variables of roll pressure, mass composition and plasticity, and mass thickness are of greater importance when an easily extensible backing material is utilized than when the backing is a material resistant to elongation, such as the so-called "rigid" backing of woven cotton fabric. By "extensible" is meant those materials having an elongation of at least 50% at 5.0 lbs. per inch width tension when elongated at the rate of 20 in. per minute after conditioning at 70° F. and 65% relative humidity. When a facing material is stripped from an adhesive-coated extensible backing, some elongation generally occurs. This elongation may tend to impart some undesirable permanent set to the backing, or cause distortion of the dressing pad, or disruption of the surface of the adhesive mass so that its instantaneous adhesion properties are impaired. Hence, the control of composition and weight of mass in the case of the extensible backing are of particular importance in that it is desirable to control these variables so that the facing material may be released from the adhesive without application of an undue amount of force. "Stripping force," as the term is used herein, is the force per inch width of facing-adhesive interface measured at standard stripping speed of 12 in. per minute required to remove the facing. Generally, the maximum stripping force which may be tolerated with extensible backing sheets is about 50 oz. per inch width, higher forces tending to cause undue disruption of extensible backing, adhesive mass, and dressing pad. Conversely, backing materials having elongation greater than 125% at 5.0 lbs. per inch width measured by the method described above may generally be ruled out on the ground that they are excessively stretchy.

The present invention affords particular advantages in the use of an elastic and extensible backing in connection with the sought-for properties of instantaneous adhesion, behavior during sterilization and provision of a product which resists distortion and is free from strain. Such backings by their very characteristic of being elastic and extensible tend to permit blowing up of any minute air bubbles occluded between the facing and the adhesive, thereby impairing the appearance of the bandage and destroying the intimacy of adhesion between facing and adhesive. The continuous facing of the adhesive and the intimate contact between facing and adhesive also impart some dimensional stability to the extensible backing which is an additional advantage.

Woven backings have, of course, an inherent roughness due to the weave, and it is desirable to use sufficient adhesive to cover up or mask the weave grid. When woven backings are employed, in order to provide a surface which is suitable for carrying an adhesive mass which may be made smooth by the facing according to the present invention, the mesh desirably should be at least about 56 by 48 threads per inch, and the amount of mass above the surface of the threads (i. e., in addition to that which permeates the backing) desirably should be at least 2 ounces per square yard.

Many other modifications are contemplated and will be readily apparent to those skilled in the art. For example, where woven cloth backing is indicated, such backing may be water-proofed with plasticized vinyl chloride, ethyl cellulose or similar material.

In order to illustrate how the invention may be carried into practice, using different organic film materials, several specific examples will now be described.

EXAMPLE I

A pressure-sensitive adhesive mass of the rubber base type compounded with the usual tackifier, plasticizer, pigment, and stabilizer was prepared. This mass was spread on a primed surface of a polyvinyl chloride film of 2.8 mils thickness, the film having an elongation of 100% at 5.0 lbs. per inch width measured by the test procedure described above. The thickness of the adhesive mass was about 2.5 mils. The adhesive-coated plastic film was employed in making adhesive bandages by suitably placing thereon folded gauze dressing pads. Laminated sheets one mil thick of cellulose triacetate film adhesively bonded to paper 3 mils thick were placed over and pressed against the exposed adhesive areas on opposite ends of the dressing pad with a roller (with the cellulose acetate next to the adhesive) to form facing material overlapping in the center portion of the adhesive bandage above the dressing pad in the fashion illustrated in Figs. 4 and 5. The force used to apply the facing against the adhesive mass was sufficient to exclude substantially all occluded air and impart to the underlying adhesive coating the smooth surface characteristics of the cellulose triacetate film.

Adhesive bandages so prepared were wrapped in glassine paper, the wrapper being sealed along a longitudinal seam and two transverse end seams. The wrapped adhesive bandages were placed in a sterilizing chamber and heated for 30 minutes at 116° C. and 25 lbs. per square inch in the presence of saturated steam in order to effect sterilization. The bandages were thereafter removed from the sterilizing chamber, the wrappers torn away, and the acetate film facing material removed from the pressure-sensitive adhesive areas of the bandage. The adhesive surface was found to be smooth and to possess excellent properties in respect to instantaneous adhesion. The facing material was readily removed with 14 oz. per inch force without tearing and was found to be substantially undegraded by the sterilization treatment.

EXAMPLE II

Example I was repeated except that the laminate of paper-acetate film facing material of Example I was replaced with a free film (unlaminated) of the same cellulose acetate film having 1.0 mil thickness. Instead of being sterilized by steam the adhesive bandage was placed in a tightly sealed vessel, the air evacuated, and a mixture of 10% ethylene oxide and 90% carbon dioxide was introduced into the vessel until a gauge pressure of 40 lbs. per square inch had been built up. A small amount of moisture was also introduced into the vessel. The temperature of the vessel was maintained at 140° F. for four hours, after which time the chamber was again evacuated and air introduced therein. After the foregoing chemical sterilization treatment the facing material and the adhesive mass were found to have equally as good properties as the adhesive bandage tested in Example I from the standpoint of instantaneous adhesion of the adhesive, tear strength of the facing, and release properties of the facing from the adhesive.

EXAMPLE III

Example I was repeated except that the laminate of paper-acetate film facing material of Example I was replaced with a free film (unlaminated) of cellophane containing no coating and, as plasticizer, only 16% glycerine and 7% water. The cellophane was designated by the manufacturer (E. I. du Pont de Nemours & Co.) as "Put" cellophane. The adhesive bandages so made were sterilized chemically according to the procedure described in Example II. After sterilization the bandages were opened and the facing material removed. The facing material was readily removed, the force required being about 16 oz. per inch measured at stripping speed of 12 in. per minute. The mass surface was found to be smooth and to possess excellent instantaneous adhesion. The facing material appeared to be undegraded and there was no wrinkling or deformation of the bandage.

EXAMPLE IV

Example I was repeated except that the laminate of paper-acetate facing material of Example I was replaced with paper 4.5 mils thick which was coated on one side with a plasticized vinyl chloride film approximately one mil thick applied to the paper by spreading thereon an organosol suspension having the following composition:

| | Parts by weight |
|---|---|
| Polyvinyl chloride resin of the organosol type | 100 |
| Nonmigratory polyester plasticizer | 26 |
| Titanium dioxide | 14 |
| "Apco" Thinner, an aliphatic hydrocarbon mixture (B. P. 125–165° C.) | 19 |
| Diisobutyl ketone | 6 |

After spreading, the film was dried for 10 minutes in an oven at 60° C., and then fused in an oven at 180° C. for 3 minutes. Some of the adhesive bandages so made were sterilized with steam according to the procedure of Example I, and others were chemically sterilized according to the procedure described in Example II. In each case the bandages were opened after sterilization and the facings removed. The facing material in each case was readily removed without tearing and was found to be essentially undegraded by either chemical or steam sterilization treatment. In the case of both types of sterilization the adhesive surface was found to be smooth and to possess excellent instantaneous adhesion.

EXAMPLE V

Example I was repeated replacing the paper-acetate facing with paper 3 mils thick coated on one side with a layer about 1 mil thick of copolymer resin of vinyl chloride and vinyl acetate. The film-forming material was spread on the paper as a solution having the following composition:

| | Parts by weight |
|---|---|
| Vinyl chloride-vinyl acetate copolymer resin | 50 |
| Methyl ethyl ketone | 50 |
| Cyclohexanone | 150 |

The film was dried by heating in an oven at 150° C. for 10 minutes. Some of the bandages made as herein described were then chemically sterilized and others were steam sterilized. Results substantially as favorable as those obtained in Example IV from the standpoint of instantaneous adhesive characteristics, stability of the facing, etc. were obtained.

EXAMPLE VI

Examples IV and V were repeated replacing the resin of those examples with butyl half-ester of a styrene-maleic anhydride copolymer coated on one side of the paper from a solution in methyl ethyl ketone containing 30% solids. After coating, the paper was dried at 80° C. This facing was found to stand up during steam sterilization of adhesive bandages and to impart excellent instantaneous adhesive characteristics to the adhesive mass.

EXAMPLE VII

Examples IV and V were repeated using as facing a paper coated with ethyl cellulose dissolved in methyl ethyl ketone to a 15% solids content solution. The facing material was found to be steam sterilizable and to impart good instantaneous adhesive characteristics to the adhesive mass surface.

EXAMPLE VIII

Adhesive bandages were prepared using as a facing material a plasticized ethyl cellulose free film (unlaminated). It was found to stand up well during steam sterilization and to impart good instantaneous adhesive characteristics to the adhesive mass.

EXAMPLE IX

Kraft paper was impregnated with a 5% solution of low viscosity grade methyl cellulose in water and was then dried at 80° C. to form a methyl cellulose film on the surface of the paper. Facing material applied to an adhesive mass in accordance with the invention and sterilized was found to resist steam sterilizing conditions satisfactorily and to impart good instantaneous adhesive characteristics to the mass.

EXAMPLE X

A high viscosity completely hydrolyzed grade of polyvinyl alcohol was dissolved in water to a 5% solution. Kraft paper was impregnated with the solution and a film formed on the paper by drying to 80° C. Adhesive bandages prepared with this facing material as herein described were found to stand up during steam sterilization and to have vastly improved properties in respect to instantaneous adhesion as compared with crinoline after removal of the facing.

EXAMPLE XI

"Lustrex X620" latex, an aqueous dispersion of polystyrene resin and plasticizer, made by Monsanto Chemical Co., was used to impregnate kraft paper. The impregnated sheet was placed in contact with a glossy, oleoresinous-coated paper and dried at 80° C. The dried paper was found to be coated with a flexible film having a smooth surface imparted by the glossy paper. Adhesive bandages made with this impregnated paper were found satisfactorily to resist steam sterilization and to possess vastly improved properties in respect to instantaneous adhesion than adhesive bandages prepared with crinoline facings.

EXAMPLE XII

"Geon 576" latex, an aqueous dispersion of a vinyl chloride resin and a plasticizer, made by the B. F. Goodrich Chemical Co., was employed to impregnated kraft paper. The impregnated sheet was placed in contact with a glossy oleoresinous paper and dried at 80° C. The impregnated paper, after drying, was covered with a flexible film of the resin having a smooth surface imparted by the glossy paper. When used as a facing material for adhesive bandages in accordance with the invention this film was found to be steam sterilizable and to impart to the mass excellent properties in respect to instantaneous adhesion.

EXAMPLE XIII

"Hycar OR-25" latex, an aqueous dispersion of a butadiene-acrylonitrile copolymer rubber, made by the B. F. Goodrich Chemical Co., was used to impregnate kraft paper. The impregnated sheet was dried at 80° C. while in contact with a glossy oleoresinous-coated paper. The impregnated paper after drying was covered with a flexible film of good strength and having a smooth surface imparted by the glossy paper. The film used as a facing material for an adhesive bandage in accordance with the invention was found to resist satisfactorily steam sterilizing conditions and to impart to the adhesive mass vastly improved properties in respect to instantaneous adhesion.

The invention described and illustrated hereinbefore and secured by these Letters Patent is defined in the following patent claims.

I claim:

1. An adhesive bandage of the type having an absorbent body portion and a marginal portion presenting a coating of normally tacky and pressure-sensitive adhesive, said adhesive coating being covered by an overlying facing member adapted to be removed therefrom prior to use of the bandage, the surface of said facing member in contact with the underlying adhesive coating comprising a film of organic material that is substantially inert with respect to said adhesive, said film having a smooth, continuous, imperforate surface maintained in such intimate contact with the underlying adhesive coating over substantially the entire surface thereof, as substantially to exclude air pockets and impart to the underlying adhesive coating, at its interface with the facing member, the smooth surface characteristics of said film, said film being releasable by said adhesive, when the facing member is removed, without separating said adhesive coating from said marginal portion and without substantially impairing the smooth surface characteristics of the adhesive coating existing at the interface prior to such removal.

2. An adhesive bandage of the type having a backing with an absorbent pad secured to one face thereof and which presents on said face a coating of normally tacky and pressure-sensitive adhesive extending beyond the edges of said pad to facilitate adhesion to the skin, said adhesive coating being covered by at least one protective facing member adapted to be removed from the bandage prior to its use, the surface of said facing member in contact with the underlying adhesive coating comprising a film of organic material that is substantially inert with respect to said adhesive, said film having a smooth, continuous, imperforate surface maintained in such intimate contact with the underlying adhesive coating over substantially the entire surface thereof as substantially to exclude air pockets and impart to the underlying adhesive coating, at its interface with said facing member, the smooth surface characteristics of said film, said film being releasable by said adhesive, when the facing member is removed, without separating said adhesive coating from said backing and without substantially impairing the smooth surface characteristics of the adhesive coating existing at the interface prior to such removal.

3. The adhesive bandage of claim 2 wherein said film comprises a cellulose acetate.

4. The adhesive bandage of claim 2 wherein said film comprises a vinyl resin.

5. The adhesive bandage of claim 2 wherein said film comprises a polyethylene resin.

6. The adhesive bandage of claim 2 wherein said film comprises a member of the group consisting of urea-formaldehyde and melamine-formaldehyde resins.

7. The product of claim 2 wherein said film comprises cellophane.

8. The adhesive bandage of claim 2 wherein said facing member comprises a free, unsupported film of said organic matter.

9. The adhesive bandage of claim 2 wherein said facing member comprises a film united to a fibrous backing.

10. An adhesive bandage of the type having a backing with an absorbent pad secured to one face thereof and which presents on said face a coating of normally tacky and pressure-sensitive adhesive extending beyond the edges of said pad to facilitate adhesion to the skin, said adhesive coating being covered by a plurality of overlying protective facing members adapted to be removed therefrom prior to use of the bandage, said facing members having finger gripping portions presenting a free surface out of contact with said adhesive to facilitate stripping said facing members from the adhesive without need of touching the absorbent pad or the adhesive, the surface of each facing member in contact with its underlying adhesive coating comprising a film of organic material that is substantially inert with respect to said adhesive, said film having a smooth, continuous, imperforate surface maintained in such intimate contact with the underlying adhesive coating over substantially the entire surface thereof as substantially to exclude air pockets and impart to the underlying adhesive coating, at its interface with the facing member, the smooth surface characteristics of said film, said film being releasable by said adhesive, when the facing member is removed, without separating said adhesive coating from said backing and without substantially impairing the smooth surface characteristics of the adhesive coating existing at the interface prior to such removal.

11. An adhesive bandage of the type having a plastic film backing with an absorbent pad secured to one face thereof and which presents on said face a coating of normally tacky and pressure-sensitive adhesive extending beyond the edges of said pad to facilitate adhesion to the skin, said adhesive coating being covered by a plurality of overlying protective facing members adapted to be removed therefrom prior to use of the bandage, said facing members having finger gripping portions presenting a free surface out of contact with said adhesive to facilitate stripping the facing members from the adhesive without need of touching the absorbent pad or the adhesive, the surface of each facing member in contact with its underlying adhesive coating comprising a film of organic material that is substantially inert with respect to said adhesive, said film having a continuous, imperforate, glossy-smooth surface maintained in such intimate contact with the underlying adhesive coating over substantially the entire surface thereof as substantially to exclude air pockets and impart to the underlying adhesive coating, at its interface with the facing member, the glossy-smooth surface characteristics of said film, said film being releasable by said adhesive, when the facing members are removed, without separating said adhesive from said plastic film backing and without substantially impairing the glossy-smooth surface characteristics of the adhesive coating existing at the interface prior to such removal.

12. An adhesive bandage of the type having a backing with an absorbent pad secured to one face thereof and which presents on said face a coating of normally tacky and pressure-sensitive adhesive extending beyond the edges of said pad to facilitate adhesion to the skin, said adhesive coating being covered by at least one protective facing member adapted to be removed from the bandage prior to its use, the surface of the facing member in contact with the underlying adhesive coating comprising a film of organic material that, under sterilizing conditions, is substantially inert with respect to said adhesive, said film having a smooth, continuous, imperforate surface maintained in such intimate contact with the underlying adhesive coating over substantially the entire surface thereof as substantially to exclude air pockets and impart to the underlying adhesive coating, at its interface with the facing member, the smooth surface characteristics of said film, said film being releasable by said adhesive, when the facing member is removed, without separating said adhesive coating from said backing and without substantially impairing the smooth surface characteristics of the adhesive coating existing at the interface prior to such removal, the entire bandage being capable of withstanding the conditions prevailing during sterilization without substantial impairment of the properties of said adhesive coating when said facing member is removed.

13. An adhesive bandage of the type having a backing with an absorbent pad secured to one face thereof and which presents on said face a coating of normally tacky and pressure-sensitive adhesive extending beyond the edges of said pad to facilitate adhesion to the skin, said adhesive coating being covered by at least one protective facing member adapted to be removed from the bandage prior to its use, the surface of the facing member in contact with the underlying adhesive coating comprising a film of organic material that, under steam sterilizing conditions, is substantially inert with respect to said adhesive, said film having a smooth, continuous, imperforate surface maintained in such intimate contact with the underlying adhesive coating over substantially the entire surface thereof as substantially to exclude air pockets and impart to the underlying adhesive coating, at its interface with the facing member, the smooth surface characteristics of said film, said film being releasable by said adhesive, when the facing member is removed, without separating said adhesive coating from said backing and without substantially impairing the smooth surface characteristics of the adhesive coating existing at the interface prior to such removal, the entire bandage being capable of withstanding the conditions prevailing during steam sterilization without substantial impairment of the properties of said adhesive coating but with an improvement in the ease with which said film is releasable by said adhesive when said facing member is removed.

14. The method of preparing an adhesive bandage which comprises placing an absorbent dressing pad on the adhesive surface of a strip of flexible backing material having a pressure-sensitive adhesive mass thereon, leaving exposed areas of adhesive, pressing into intimate contact with said exposed areas of mass a facing sheet having two opposite surfaces and at least one of said opposite surfaces being continuous and smooth and of organic material which is substantially inert to the mass, said one surface being in contact with the mass, said pressing step being carried out at sufficient pressure to exclude from the interface between the facing material and the adhesive substantially all occluded air, the smooth surface characteristics of the overlying facing sheet being imparted to the underlying adhesive mass and remaining thereon after removal of said facing sheet.

15. The method of preparing an adhesive bandage which comprises placing absorbent dressing pads on the adhesive surface of a continuous moving strip of flexible backing material having a pressure-sensitive adhesive mass thereon leaving exposed areas of adhesive, pressing into intimate contact with said exposed areas of mass a facing sheet having two opposite surfaces and at least one of said opposite surfaces being continuous and smooth and of organic material which is substantially inert to the mass, said one surface being in contact with the mass, said pressure being applied by means of a roller at a pressure sufficient to exclude from the interface between the facing material and the adhesive substantially all occluded air, the smooth surface characteristics of the overlying facing sheet being imparted to the underlying adhesive mass and remaining thereon after removal of said facing sheet.

16. In the method of preparing an adhesive bandage the steps which comprise placing absorbent dressing pads on the adhesive surface of a continuous moving strip of flexible extensible backing sheet having an extensibility greater than 50% under a force of 5.0 lbs. per inch width when elongated at 20 inches per minute measured at 70° F. and a 65% relative humidity, said backing sheet having a pressure-sensitive adhesive mass thereon, leaving exposed areas of adhesive, pressing into intimate contact with said exposed areas of mass a facing sheet having two opposite surfaces and at least one of said opposite surfaces being continuous and smooth and of organic material which is substantially inert to the mass, said one surface being in contact with the mass, said pressure being applied by means of a roller, and maintaining the pressure applied by said roller sufficiently high to exclude from the interface between the facing sheet and the adhesive substantially all occluded air, the finished bandage having a smooth continuous mass surface which adheres itself securely to solid objects with application of slight pressure after removal of said facing sheet from said finished bandage.

17. In the method of preparing an adhesive bandage the steps which comprise placing absorbent dressing pads on the adhesive surface of a continuous moving strip of flexible extensible backing sheet having an extensibility greater than 50% but not greater than 125% under a force of 5.0 lbs. per inch width when elongated at 20 inches per minute measured at 70° F. and a 65% relative humidity, said backing sheet having a pressure-sensitive adhesive mass thereon leaving exposed areas of adhesive, pressing into intimate contact with said exposed areas of mass a facing sheet having two opposite surfaces and at least one of said opposite surfaces being continuous, smooth and glossy and of organic material which is substantially inert to the mass, said one surface being in contact with the mass, said pressure being applied by means of a roller, and correlating the pressure applied by said roller with the composition of the adhesive mass and the thickness of said mass to exclude from the interface between the facing sheet and the adhesive substantially all occluded air, the finished bandage having a smooth, glossy, continuous mass surface which adheres itself securely to solid objects with application of slight pressure after removal of said facing sheet from said finished bandage.

18. In the method of preparing an adhesive bandage the steps which comprise placing absorbent dressings pads on the adhesive surface of a continuous moving strip of flexible extensible backing sheet having an extensibility greater than 50% but not greater than 125% under a force of 5.0 lbs. per inch width when elongated at 20 in. per minute measured at 70° F. and a 65% relative humidity, said backing sheet having a pressure-sensitive adhesive mass thereon leaving exposed areas of adhesive, pressing into intimate contact with said exposed areas of mass a facing sheet having two opposite surfaces and at least one of said opposite surfaces being continuous, smooth and glossy and of organic material which is substantially inert to the mass, said one surface being in contact with the mass, said pressure being applied by means of a roller and controlling the pressure applied by said roller with respect to the composition of the adhesive mass and the thickness of said mass, to exclude from the interface between the facing sheet and the adhesive substantially all occluded air, to control the release force of said facing sheet from said mass to not greater than 50 oz. per inch, and to provide a finished bandage which has a smooth glossy continuous mass surface which adheres itself securely to solid obects with application of slight pressure after removal of said facing sheet from said finished bandage.

References Cited in the file of this patent

UNITED STATES PATENTS

| 2,029,260 | Eustis et al. | Jan. 28, 1936 |
| 2,450,083 | Donaldson | Sept. 28, 1948 |
| 2,484,045 | Morgan | Oct. 11, 1949 |
| 2,532,011 | Dahlquist et al. | Nov. 28, 1950 |

FOREIGN PATENTS

| 755,273 | France | Sept. 4, 1933 |